United States Patent
Malosh

(10) Patent No.: US 8,060,083 B2
(45) Date of Patent: Nov. 15, 2011

(54) SYSTEM FOR MANAGING AN AIRCRAFT-ORIENTED EMERGENCY SERVICES CALL IN AN AIRBORNE WIRELESS CELLULAR NETWORK

(75) Inventor: Mark Malosh, Newark, IL (US)

(73) Assignee: Gogo LLC, Itasca, IL (US)

( * ) Notice: Subject to any disclaimer, the term of this patent is extended or adjusted under 35 U.S.C. 154(b) by 34 days.

(21) Appl. No.: 12/182,834

(22) Filed: Jul. 30, 2008

(65) Prior Publication Data

US 2008/0305762 A1    Dec. 11, 2008

Related U.S. Application Data

(63) Continuation-in-part of application No. 11/492,545, filed on Jul. 24, 2006, which is a continuation of application No. 10/730,329, filed on Dec. 7, 2003, now Pat. No. 7,113,780, which is a continuation-in-part of application No. 09/686,923, filed on Oct. 11, 2000, now Pat. No. 6,788,935.

(51) Int. Cl.
  *H04W 4/00* (2009.01)
  *H04M 3/42* (2006.01)
(52) U.S. Cl. ......... 455/431; 455/430; 455/417; 455/416
(58) Field of Classification Search .................. 455/431, 455/404, 66.1, 430, 417, 416, 410; 340/963, 340/506, 945; 725/105; 709/230, 227
See application file for complete search history.

(56) References Cited

U.S. PATENT DOCUMENTS

| | | | |
|---|---|---|---|
| 6,314,286 B1 * | 11/2001 | Zicker | 455/431 |
| 6,353,734 B1 | 3/2002 | Wright et al. | |
| 6,788,935 B1 | 9/2004 | McKenna et al. | |
| 6,963,292 B1 * | 11/2005 | White | 340/963 |
| 7,131,136 B2 * | 10/2006 | Monroe | 725/105 |
| 2003/0032426 A1 | 2/2003 | Gilbert et al. | |
| 2003/0093187 A1 | 5/2003 | Walker | |
| 2003/0109245 A1 * | 6/2003 | McCalmont et al. | 455/404 |
| 2004/0142658 A1 | 7/2004 | McKenna et al. | |
| 2007/0042772 A1 * | 2/2007 | Salkini et al. | 455/431 |

OTHER PUBLICATIONS

Casewell, I.E.; "The Provision of GSM Cellular Radio Environments With Passenger Aircraft Operating Over Europe"; IEEE Fifth International Conference; Dec. 11-14, 1989; pp. 172-176.

In the US Patent and Trademark Office in re: U.S. Appl. No. 09/686,923, Non-Final Office Action dated Jul. 8, 2003, number of pages unknown; and corresponding response dated Sep. 29, 2003, number of pages unknown.

(Continued)

*Primary Examiner* — Kiet Doan
(74) *Attorney, Agent, or Firm* — Patton Boggs LLP

(57) ABSTRACT

The Aircraft Emergency Services Call Management System enables the unique identification of each passenger wireless device in use in an aircraft and the corresponding identification of the passenger associated with the passenger wireless device. This passenger wireless device registration data is stored as database entries in a ground-based Automatic Location Identification (ALI) database which associates each aircraft with its registered passenger wireless devices. The origination of an emergency services call by any registered passenger wireless device results in the call being routed to a serving Public Safety Access Point (PSAP) where the passenger is connected to an emergency services operator. Since the aircraft flight crew and cabin crew are the only personnel on site that can be relied upon to provide some sort of emergency services response, they are included in the emergency services call.

15 Claims, 7 Drawing Sheets

OTHER PUBLICATIONS

In the US Patent and Trademark Office in re: U.S. Appl. No. 09/686,923, Final Office Action dated Dec. 2, 2003, number of pages unknown; corresponding response dated Jan. 9, 2004, number of pages unknown; and supplemental response dated Feb. 20, 2004, number of pages unknown.

In the US Patent and Trademark Office in re: U.S. Appl. No. 10/730,329, Non-Final Office Action dated May 18, 2005, 10 pages; and corresponding response dated Aug. 18, 2005, 34 pages.

In the US Patent and Trademark Office in re: U.S. Appl. No. 10/730,329, Final Office Action dated Nov. 25, 2005, 16 pages; corresponding response dated Jan. 25, 2006, 32 pages; supplemental response dated Feb. 17, 2006, 31 pages; additional supplemental response dated Mar. 27, 2006, 21 pages; and additional supplemental response with RCE dated Apr. 14, 2006, 21 pages.

In the US Patent and Trademark Office in re: U.S. Appl. No. 11/492,545, Non-Final Office Action dated Aug. 7, 2008, 19 pages; and corresponding response dated Oct. 10, 2008, 29 pages.

In the US Patent and Trademark Office in re: U.S. Appl. No. 11/492,545, Final Office Action dated Dec. 19, 2008, 18 pages; and corresponding response dated Jan. 27, 2009, 34 pages; and supplemental response dated Apr. 17, 2009, 35 pages.

In the US Patent and Trademark Office in re: U.S. Appl. No. 11/492,545, Non-Final Office Action dated Jun. 10, 2009, 20 pages; and corresponding response dated Sep. 3, 2009, 32 pages.

In the US Patent and Trademark Office in re: U.S. Appl. No. 11/590,146, Non-Final Office Action dated Sep. 24, 2008, 12 pages; and corresponding response dated Jan. 29, 2009, 13 pages.

In the US Patent and Trademark Office in re: U.S. Appl. No. 11/590,146, Final Office Action dated Mar. 31, 2009, 10 pages; and corresponding response dated May 29, 2009, 16 pages.

In the US Patent and Trademark Office in re: U.S. Appl. No. 12/021,133, Non-Final Office Action dated Jun. 18, 2009, 14 pages; and corresponding response dated Sep. 9, 2009, 19 pages.

International Search Report issued Jul. 17, 2009 in co-pending application PCT/US2009/042788 (4 pages).

* cited by examiner

SYSTEM FOR MANAGING AN AIRCRAFT-ORIENTED EMERGENCY SERVICES CALL IN AN AIRBORNE WIRELESS CELLULAR NETWORK

CROSS-REFERENCE TO RELATED APPLICATIONS

This application is a continuation-in-part of U.S. patent application Ser. No. 11/492,545 filed Jul. 24, 2006; which is a continuation of U.S. patent application Ser. No. 10/730,329 filed Dec. 7, 2003, now U.S. Pat. No. 7,113,780 issued Sep. 26, 2006; which is a continuation-in-part of U.S. patent application Ser. No. 09/686,923 filed Oct. 11, 2000, now U.S. Pat. No. 6,788,935 issued Sep. 7, 2004.

FIELD OF THE INVENTION

This invention relates to cellular communications and, in particular, to a system that processes an emergency services call originated onboard an aircraft in an airborne wireless cellular network.

BACKGROUND OF THE INVENTION

It is a problem in the field of wireless communications to manage the wireless services provided by an aircraft network to passengers (also termed "subscribers" herein) who are located in the aircraft as they roam among cell sites in the non-terrestrial cellular communication network. The aircraft network serves a plurality of subscribers, yet has a link to the ground-based network via a wide bandwidth connection that concurrently serves multiple individual subscribers. The management of this wide bandwidth connection to enable the individual identification of aircraft-based subscribers has yet to be addressed in existing wireless networks.

In the field of terrestrial cellular communications, it is common for a wireless subscriber to move throughout the area served by the network of their home cellular service provider and maintain their desired subscriber feature set. Feature set availability throughout the home network is managed by the home cellular service provider's database, often termed a Home Location Register (HLR), with data connections to one or more switches (packet or circuit), and various ancillary equipment, such as voice mail and short message servers, to enable this seamless feature set management. Each subscriber is associated with a one-to-one communication connection, which comprises a channel on the serving cell site, to access the desired communication services.

Emergency Services access is an important feature of existing telecommunications networks, with the network being capable of not only identifying the subscriber but also their present location to facilitate dispatching emergency services personnel. A universal code, such as 911 in North America and 112 in Europe, is used to access emergency dispatch personnel at predefined sites termed "Public Safety Access Points (PSAPs)". Enhanced 911 (E911) is an extension of this basic service and is defined by the transmission of callback number and geographical location information to the emergency dispatch personnel. The term "geographical location information" is used to refer to information about the physical position of a subscriber in the physical environment as opposed to a communications network address. For example, it comprises a civic address, postal address, street address, latitude and longitude information, or geodetic location information. E911 may be implemented for landline and/or wireless devices. Voice-Over-Internet Protocol (VoIP) is a technology that emulates a phone call, but instead of using a circuit based system such as the telephone network, it utilizes packetized data transmission techniques most notably implemented in the Internet. Thus, in the existing telecommunications networks, there are a number of instances where the geographical location of the subscriber cannot be identified.

In order to promptly dispatch emergency service vehicles or other assistance to the correct destination, accurate information about the geographical location of the subscriber is needed. In conventional wire-line switched telephone networks, it is possible to provide the subscriber location information relatively easily because telephone handsets are fixed in particular locations. Static database entries can then be made in a database which is accessible to the emergency services personnel at the Public Safety Access Points (PSAPs) to associate a subscriber's home address and telephone number. However, for mobile communication systems, the use of such static database entries is not possible because the geographical location of a wireless communications device varies over time.

Another problem concerns routing emergency calls to the correct destination. For regular calls, this is not such an issue because the subscriber enters specific details of the required call destination. However, for emergency calls, the jurisdiction for emergency services answering points typically is quite small, for example, at the county level in the USA. This information about the geographical location of the subscriber is needed to determine the routing of the call to the proper Public Safety Access Point (PSAP). Misrouting of calls to the wrong answering point leads to costs in transferring calls, impacts reliability, and leads to delays in dispatching emergency services personnel which are significant in life-threatening situations.

When wireless subscribers enter the non-terrestrial cellular communication network (that is, they fly in an aircraft as passengers), they encounter a unique environment that traditionally has been disconnected from the terrestrial cellular network, where the wireless network of the aircraft interfaces the subscriber (also termed "passenger" herein) to various services and content. The aircraft wireless network, therefore, can function as a content filter or can create unique types of content that are directed to the individual passengers who are onboard the aircraft. However, although the aircraft network serves a plurality of passengers, it has a link to the ground-based Access Network via a wide bandwidth radio frequency connection that has a single IP address on the ground-based Access Network. The wide bandwidth radio frequency connection concurrently carries the communications of multiple individual passengers, but these communications cannot be individually identified by the ground-based Access Network. The management of this wide bandwidth connection to enable the individual identification of passengers via the assignment of individual unique IP addresses to each passenger wireless device has yet to be addressed in existing wireless networks.

Furthermore, the processing of an emergency services call where the subscriber is located in an aircraft raises issues heretofore never addressed, especially since the location of the subscriber continually changes as the aircraft continues on its flight. The aircraft flight crew and cabin crew are the only personnel on site that can be relied upon to provide some sort of emergency services response, and they must be intimately involved in an emergency services call. In addition, emergency services personnel cannot be dispatched to the aircraft, but the aircraft can be dispatched to an alternate destination given the proper authorization to enable the emergency to be resolved at that alternate location. However, the process to effectuate such a decision and the communications architecture to support this process are presently not developed.

BRIEF SUMMARY OF THE INVENTION

The above-described problems are solved and a technical advance achieved in the field by the present System For Managing An Aircraft-Originated Emergency Services Call In An Airborne Wireless Cellular Network (termed "Aircraft Emergency Services Call Management System" herein), which enables the unique identification of each passenger wireless device in use in an aircraft and the corresponding identification of the passenger associated with the passenger wireless device. This passenger wireless device registration data is stored as database entries in a ground-based Automatic Location Identification (ALI) database which associates each aircraft with its registered passenger wireless devices.

The origination of an emergency services call by any registered passenger wireless device results in the call being routed to a serving Public Safety Access Point (PSAP), where the passenger is connected to an emergency services operator. The serving Public Safety Access Point (PSAP) can be selected as a function of the present geographical location of the aircraft or may be a predetermined national Public Safety Access Point (PSAP). In addition, since the aircraft flight crew and cabin crew are the only personnel on site that can be relied upon to provide some sort of emergency services response, they must be involved in the emergency services call. Therefore, at least one of the aircraft flight crew and cabin crew are alerted and typically bridged on to the emergency services call. In addition, the Aircraft Emergency Services Call Management System has the capability to support communications with additional organizations and their personnel. Since emergency services personnel cannot be dispatched to the aircraft, these additional organizations can include air traffic controllers needed to re-route the aircraft to an alternate destination to enable the emergency to be resolved at that alternate location. Furthermore, the emergency services personnel at the alternate destination can be contacted to stage the first responders so they are available upon the arrival of the aircraft at the alternate destination.

The Aircraft Emergency Services Call Management System can process emergency services calls, whether voice calls, VoIP calls, or data messages, in order to provide emergency communications in all modes.

DETAILED DESCRIPTION OF THE INVENTION

Existing Wire-Line, Wireless, and VoIP Emergency Services Systems

The existing emergency services network is made up of Selective Routers (SR), Automatic Location Identification (ALI) databases (both local and national), and Public Safety Answering Points (PSAPs) with their various Centralized Automatic Message Accounting (CAMA), trunk connections, and various data connections for querying the Automatic Location Identification (ALI) databases. Beyond these network elements are the public safety organizations themselves (Police, Fire, and Ambulance) and the communications networks that support them.

Figure 6:
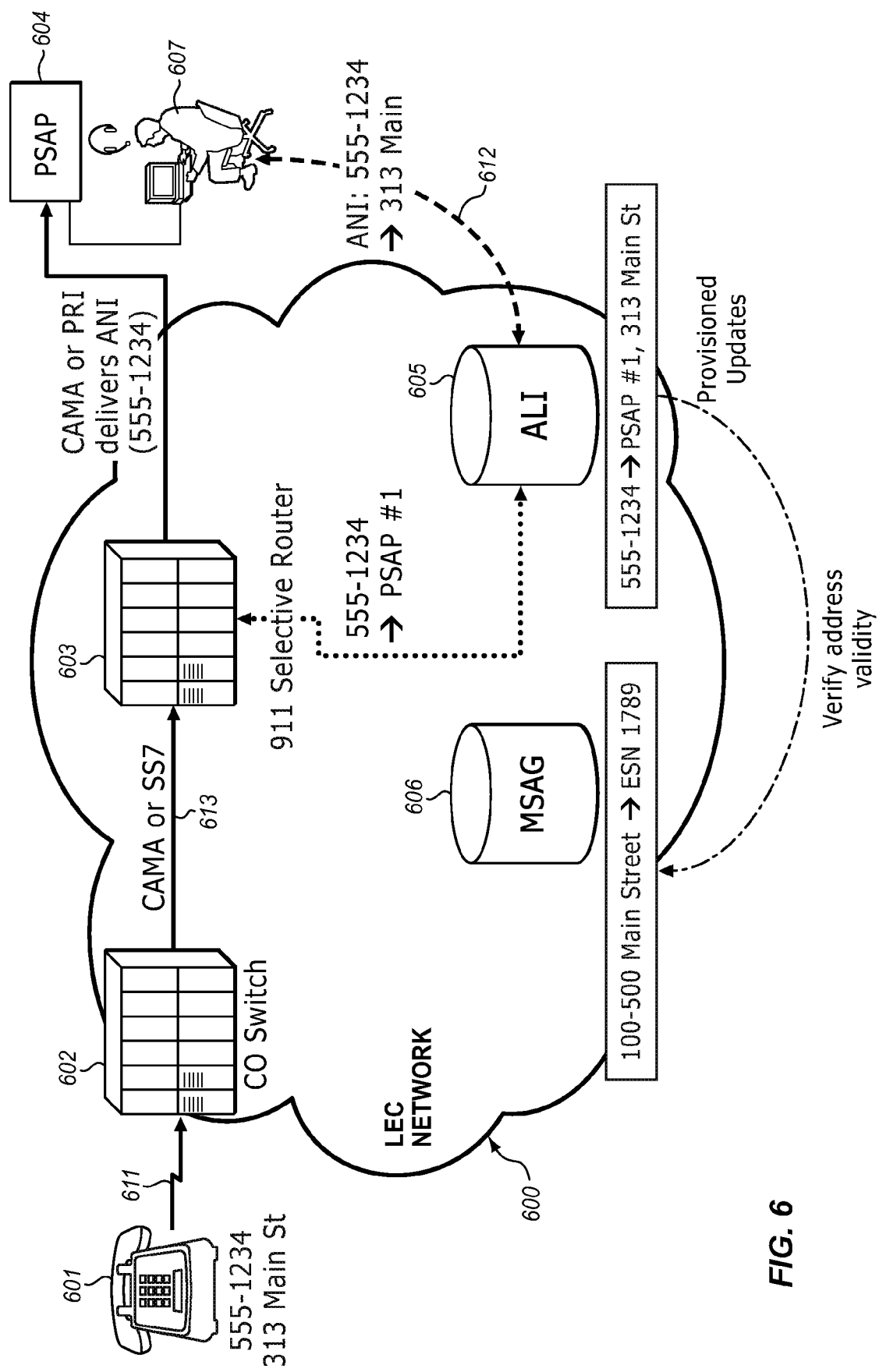
FIG. 6 illustrates, in block diagram form, a typical existing E911 network for wire-line applications.

FIG. 6 illustrates, in block diagram form, a typical existing E911 network for wire-line applications. The location of the subscriber, who is calling the emergency services network, is used for two key purposes. The first is routing of the emergency services call to the correct Public Safety Answering Point (PSAP) 604, and the second is in the delivery of the geographical location information of the subscriber for display to the Public Safety Answering Point (PSAP) operator 607 in order that emergency response units can be dispatched to the correct location. In a wire-line voice network, calling line address information is stored in a database known as an Automatic Location Identification (ALI) database 605. This information in the Automatic Location Identification (ALI) database 605 is updated and verified by synching the Automatic Location Identification (ALI) database 605 with the Master Street Address Guide (MSAG) database 606 which is a system used by the local exchange carrier to associate a telephone number from a subscriber to an Emergency Service Zone (ESZ).

In wire-line voice networks 600, there is an association between the subscriber's phone number (Calling Line Identifier (CLID)), which identifies the telephone line 611 which serves the subscriber's telephone station set 601, and that subscriber's geographical location. This geographical location is generally the home address of the subscriber, which information is maintained by their Local Exchange Carrier (LEC) in the Automatic Location Identification (ALI) database 605. In this case, the Calling Line Identifier (CLID) becomes a ready reference, and the incoming line to the local exchange switch 602 and the local exchange switch 602 provide an explicit indication of the appropriate routing of 911 calls. This permits the local exchange switch 602 to work from a static configuration in terms of selecting the outgoing trunk 613 on which to place the call so it is directed to the correct Selective Router 603. The Selective Router 603, in turn, can use the same static association and Calling Line Identifier (CLID) information stored in the Automatic Location Identification (ALI) 605 to ensure that the call is routed to the correct serving Public Safety Answering Point (PSAP) 604 for the subscriber's address.

On receipt of an emergency call from the subscriber, armed with the subscriber's Calling Line Identifier (CLID), the Public Safety Answering Point (PSAP) 604 is able to query this database via link 612 and receive, in return, the street address (also known as a civic address) information associated with the Calling Line Identifier (CLID). The physical interface over which the Public Safety Answering Point (PSAP) 604 makes this query is variable. It may be an IP-based interface over dial-up or broadband, or it may be made over an X.25 packet interface. Similarly, the Automatic Location Identification (ALI) database 605 may physically be co-located within the Local Exchange Carrier 602 and Selective Router 603, or it may be a remote national Automatic Location Identification (ALI) (not shown) which handles the request directly or in tandem from the local Automatic Location Identification (ALI) 605. The operator at the Public Safety Answering Point (PSAP) 604 gathers information from the calling party and uses this information, along with the automatically delivered information, to deliver an emergency service request to the appropriate emergency services organization.

Figure 7:
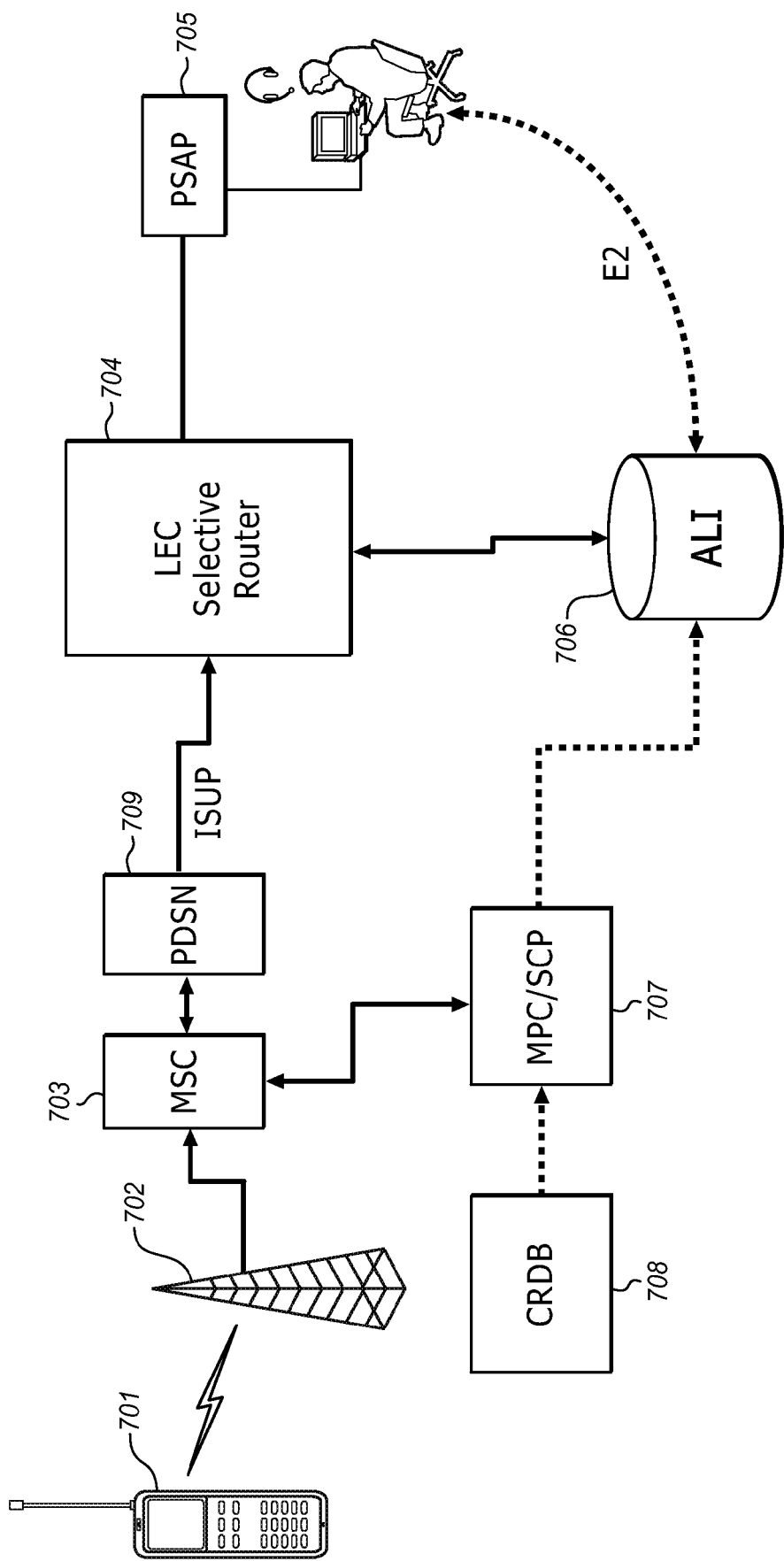
FIG. 7 illustrates, in block diagram form, a typical existing E911 network for wireless applications.

FIG. 7 illustrates, in block diagram form, a typical existing E911 network for wireless applications. In cellular systems, the association between the subscriber's present geographical location and their Calling Line Identifier (CLID) is lost. Being mobile, by definition, a cellular subscriber can be anywhere within the wireless network's area of coverage. Similarly, there is no physical wire-line corresponding to the wireless device 701 which is the source of the call from which to associate a route to the correct destination. In cellular networks, however, there is a physical serving cell 702 from which the call is initiated. The geographic granularity of these cell locations is generally sufficiently fine for the Mobile Switching Center 703 to determine the correct trunk route via PSDN 709 to a corresponding Selective Router 704. In many cases, this also provides sufficient accuracy for the Selective Router 704 to determine which Public Safety Answering Point (PSAP) 705 the subscriber should be connected with.

It is an internal procedure for the Mobile Switching Center 703 to associate an outgoing trunk route with a serving cell 702. However, some signaling is required for a Mobile Switching Center (MSC) 703 to pass this same information along to the Selective Router 704 so that it can determine the correct Public Safety Answering Point (PSAP) 705. The routing information is passed to the Selective Router 704 in the ISUP (ISDN user part) call setup signaling in one or another newly-defined parameter called the Emergency Services Routing Digits (ESRD) or the Emergency Services Routing Key (ESRK). The Selective Router 704 examines the value of the ESRD/ESRK parameter in the call setup signaling and routes the call to the correct Public Safety Answering Point (PSAP) 705 based on this value.

Note that there are circumstances where cell boundaries can span the boundaries of Public Safety Answering Point (PSAP) catchment areas. In this case, the Emergency Services Routing Digits or Emergency Services Routing Key determined from a serving cell 702 may not provide a reliable indication of a route to the correct Public Safety Answering Point (PSAP) 705. Both ANSI-41 (generally TDMA and CDMA) and 3GPP (generally GSM, EDGE, and UMTS) cellular networks have identified functionality to address this. In ANSI-41 networks, a functional element known as a Coordinate Routing Database (CRDB) 708 is defined. The cellular network can consult the Coordinate Routing Database (CRDB) 708 and, based on the geographical location of the subscriber (determined by different positioning technologies such as forward link trilateration, pilot strength measurements, time of arrival measurements, etc.), it returns an appropriate value of the routing parameter. As long as the geographical location is an improvement in accuracy over the cell location, this mitigates the problem of misrouted calls. Similarly, 3GPP networks allow the Mobile Switching Center (MSC) 703 to request a refined routing key value from the Gateway Mobile Location Center (GMLC) based on the geographical location of the subscriber. This location data is available to the Service Control Point 707 which is a standard component of an Intelligent Networks telephone system used to control the service.

Just as cellular networks have specific characteristics that result in new considerations for E911 compared to conventional wire-line voice networks, IP-based voice (VoIP) networks have much in common with cellular networks in that there is no specific physical point of connection which dictates their identity. Just as a wireless device (cellular phone) can attach to the network anywhere that there is a point of coverage, so too can an IP-based phone client attach to an IP network at many and varied points and take advantage of the voice service. From this perspective, it becomes necessary to view VoIP clients as essentially nomadic or even fully mobile to ensure that all usage scenarios are covered. For certain, many VoIP clients may be relatively static in terms of location (for example, a conventional form factor desktop phone with integrated VoIP client software tends to be as stationary as any conventional wire-line desktop phone); however, this situation is not explicitly predictable by the network, so an architecture that addresses mobility ensures that all usage scenarios are covered.

Airborne Wireless Cellular Network Architecture

Figure 1:
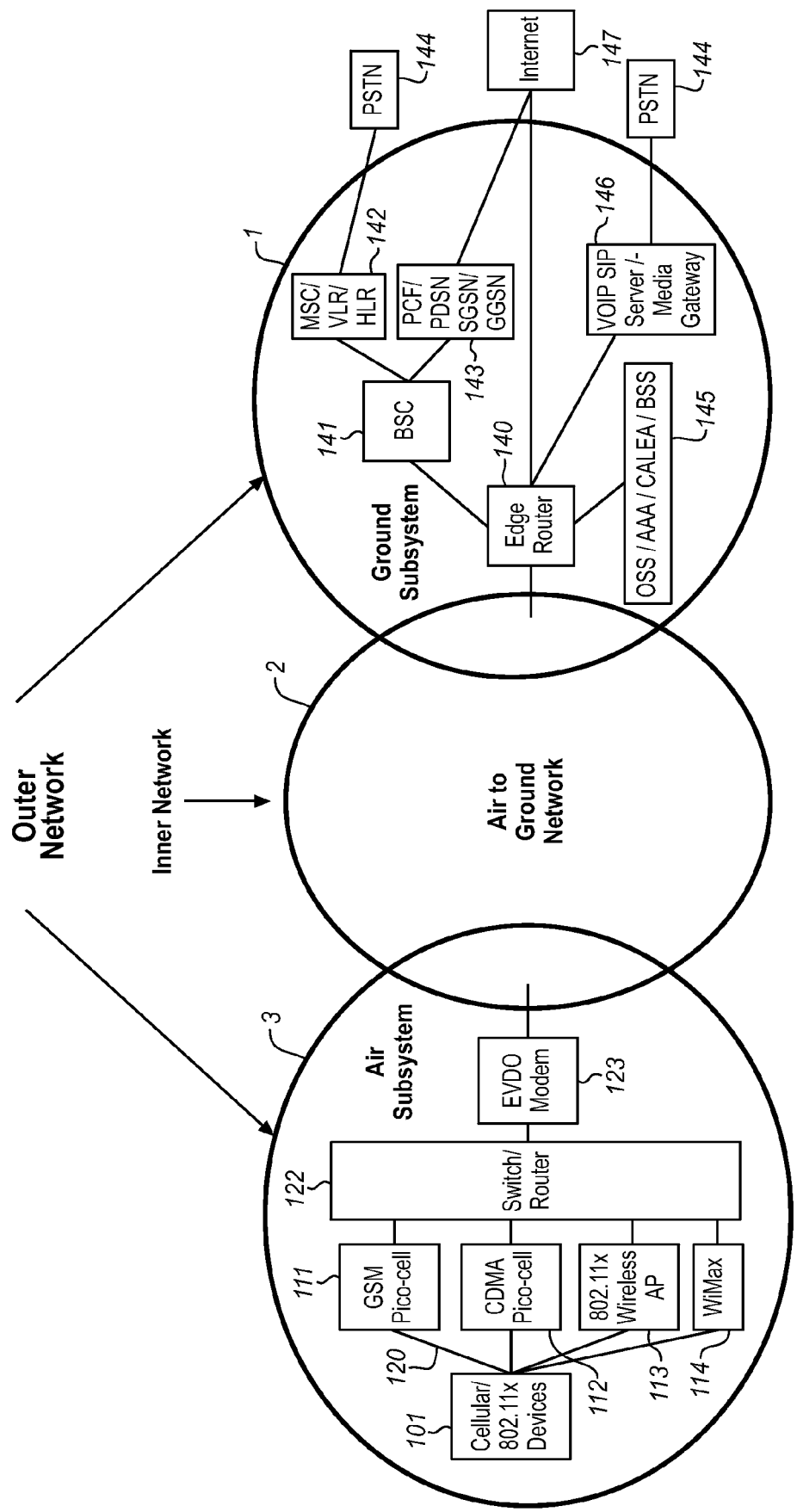
FIG. 1 illustrates, in block diagram form, the overall architecture of a composite air-to-ground network that interconnects an Air Subsystem with a Ground-Based Access Network.

FIG. 1 illustrates, in block diagram form, the overall architecture of the airborne wireless cellular network, which includes an Air-To-Ground Network 2 Inner Network) that interconnects the two elements of an Outer Network, comprising an Air Subsystem 3 and Ground Subsystem 1 (also termed "Access Network" herein). This diagram illustrates the basic concepts of the airborne wireless cellular network and, for the purpose of simplicity of illustration, does not comprise all of the elements found in a typical airborne wireless cellular network. The fundamental elements disclosed in FIG. 1 provide a teaching of the interrelationship of the various elements which are used to implement an airborne wireless cellular network to provide content to passengers' wireless devices which are located in an aircraft.

The overall concept illustrated in FIG. 1 is the provision of an "Inner Network" that connects the two segments of the "Outer Network", comprising the Air Subsystem 3 and the Ground Subsystem 1. This is accomplished by the Air-To-Ground Network 2 transmitting both the passenger communication traffic (comprising voice and/or other data) and control information and feature set data between the Air Subsystem 3 and the Ground Subsystem 1 thereby to enable the passengers' wireless devices that are located in the aircraft to receive communication services in the aircraft.

Air Subsystem

The "Air Subsystem" is the communications environment that is implemented in the aircraft; and these communications can be based on various technologies, including but not limited to: wired, wireless, optical, acoustic (ultrasonic), and the like. An example of such a network is disclosed in U.S. Pat. No. 6,788,935, titled "Aircraft-Based Network For Wireless Subscriber Stations".

The preferred embodiment for the Air Subsystem 3 is the use of wireless technology and for the wireless technology to be native to the passengers' wireless devices that passengers and crew carry on the aircraft. Thus, a laptop computer can communicate via a WiFi or WiMax wireless mode (or via a wired connection, such as a LAN), or a PDA could communicate telephony voice traffic via VoIP (Voice over IP). Likewise, a handheld cell phone that uses the GSM protocol communicates via GSM when inside the aircraft to the Air Subsystem. A CDMA cell phone would use CDMA, and an analog AMPS phone would use analog AMPS when inside the aircraft to the Air Subsystem 3. The connection states could be packet-switched or circuit-switched or both. Overall, the objective on the Air Subsystem 3 is to enable seamless and ubiquitous access to the Air Subsystem 3 for the passengers' wireless devices that are carried by passengers and crew, regardless of the technology used by these wireless devices.

The Air Subsystem 3 also provides the mechanism to manage the provision of services to the passengers' wireless devices that are operating in the aircraft cabin. This management includes not only providing the passenger traffic connectivity but also the availability of aircraft-specific feature sets which each passenger is authorized to receive. These features include in-flight entertainment services, such as multi-media presentations, as well as destination-based services which link the passenger's existing travel plans with offers for additional services that are available to the passenger at their nominal destination and their planned travel schedule. The passenger thereby is presented with opportunities during their flight to enhance their travel experience, both in-flight and at their destination.

The passengers' wireless devices 101 used in the aircraft can be identical to those used on the cellular/PCS ground-based communication network; however, these passengers' wireless devices 101 are pre-registered with the carrier serving the aircraft and/or users have PIN numbers for authentication. In addition, an antenna interconnects the passengers' wireless devices 101 with the in-cabin Base Transceiver Stations (BTS) 111-114, which are typically pico-cells with BSC/MSC functions integrated. BTS/BSC/MSC modules are added for each air-interface technology supported. The Switch/Router 122 acts as the bridging function (for media/content and signaling to a limited extent) between the Air Subsystem 3 and the ground-based Access Network 1, since the Switch/Router 122 places a call using the Modem 123 to the ground-based Access Network 1 via the Air-To-Ground Network 2. Switch/Router 122 which converts the individual traffic and signaling channels from the base stations to/from an aggregate data stream, and transmits/receives the aggregate data streams over the Air-to-Ground Network 2 which maintains continuous service as the aircraft travels. The Modem 123 includes radio transmission equipment and antenna systems to communicate with ground-based transceivers in the ground-based portion of the Air-to-Ground Network 2. The individual traffic channels assigned on the Air-to-Ground Network 2 are activated based upon the traffic demand to be supported from the aircraft.

Air-to-Ground Network

The Air-to-Ground Network 2 shown in FIG. 1 is clearly one that is based on wireless communications (radio frequency or optical) between the Ground Subsystem 1 and the passengers' wireless devices that are located in the aircraft, with the preferred approach being that of a radio frequency connection. This radio frequency connection takes on the form of a cellular topology where typically more than one cell describes the geographic footprint or coverage area of the composite Air-To-Ground Network 2. The air-to ground connection carries both passenger communications traffic and native network signaling traffic. In the preferred embodiment, the Air-to-Ground Network 2 transports all traffic to/from the aircraft in a single, aggregated communication channel. This "single pipe" has distinct advantages in terms of managing hard and soft handoffs as the aircraft transitions between one ground-based cell to the next. This approach also takes advantage of newer, higher speed wireless cellular technologies.

Alternatively, the Air-To-Ground Network 2 could be achieved through a wireless satellite connection where radio frequency links are established between the aircraft and a satellite and between the satellite and the Ground Subsystem 1, respectively. These satellites could be geosynchronous (appears to be stationary from an earth reference point) or moving, as is the case for Medium Earth Orbit (MEO) and Low Earth Orbit (LEO). Examples of satellites include, but are not limited to: Geosynchronous Ku Band satellites, DBS satellites (Direct Broadcast Satellite), the Iridium system, the Globalstar system, and the Inmarsat system. In the case of specialized satellites, such as those used for Direct Broadcast Satellite, the link typically is unidirectional, that is, from the satellite to the receiving platform, in this case an aircraft. In such a system, a link transmitting unidirectionally from the aircraft is needed to make the communication bidirectional. This link could be satellite or ground-based wireless in nature as previously described. Lastly, other means for communicating with aircraft include broad or wide area links such as HF (High Frequency) radio and more unique systems such as troposcatter architectures.

The Air-To-Ground Network 2 can be viewed as the conduit through which the passenger communications traffic, as well as the control and network feature set data, is transported between the Ground Subsystem 1 and the Air Subsystem 3. The Air-To-Ground Network 2 can be implemented as a single radio frequency link or multiple radio frequency links, with a portion of the signals being routed over different types of links, such as the Air-To-Ground Link and the Satellite Link. Thus, there is a significant amount of flexibility in the implementation of this system, using the various components and architectural concepts disclosed herein in various combinations.

Ground Subsystem

The Ground Subsystem 1 consists of Edge Router 140 which connects the voice traffic of the Air-To-Ground Network 2 with traditional cellular communication network elements, including a Base Station Controller 141 and its associated Mobile Switching Center 142 with its Visited Location Register, Home Location Register to interconnect the voice traffic to the Public Switched Telephone Network 144, and other such functionalities. In addition, the Base Station Controller 141 is connected to the Internet 147 via Public Switched Data Network 143 for call completions. Edge Router 124 also provides interconnection of the data traffic to the Internet 147, Public Switched Telephone Network 144 via Voice Over IP Server 146, and other such functionalities. These include the Authentication Server, Operating Subsystems, CALEA, and BSS servers 145.

Thus, the communications between the passengers' wireless devices 101 located in an aircraft and the Ground Subsystem 1 of the ground-based communication network are transported via the Air Subsystem 3 and the Air-To-Ground Network 2 to the ground-based Base Station Controllers 141 of the airborne wireless cellular network. The enhanced functionality described below and provided by the Air Subsystem 3, the Air-To-Ground Network 2, and the ground-based Base Station Controllers 141 renders the provision of services to the passengers' wireless devices 101 located in an aircraft transparent to the passengers. The Radio Access Network (RAN) supports communications from multiple aircraft and may employ a single omni-directional signal, or may employ multiple spatial sectors which may be defined in terms of azimuth and/or elevation angles. Aircraft networks hand over the Point-to-Point communication links between Radio Access Networks (RAN) in different locations (different Ground Subsystems 1) in order to maintain continuity of service on Air-to-Ground Network 2. Handovers may be hard or soft, or may be a combination of hard and soft on the air-ground and ground-air links.

The Mobile Switching Center (MSC) provides mobility management for all airborne systems and provides hand-over management between ground stations as an airborne system moves between the service areas of adjoining Ground Subsystems 1. The Base Station Controller (BSC) interfaces all traffic to/from the Base Transceiver Subsystem (BTS). The Packet Data Serving Node (PDSN) controls assignment of capacity of each of the Base Transceiver Subsystems (BTS) amongst the airborne systems within their respective service areas.

Typical Aircraft-Based Network

Figure 2:
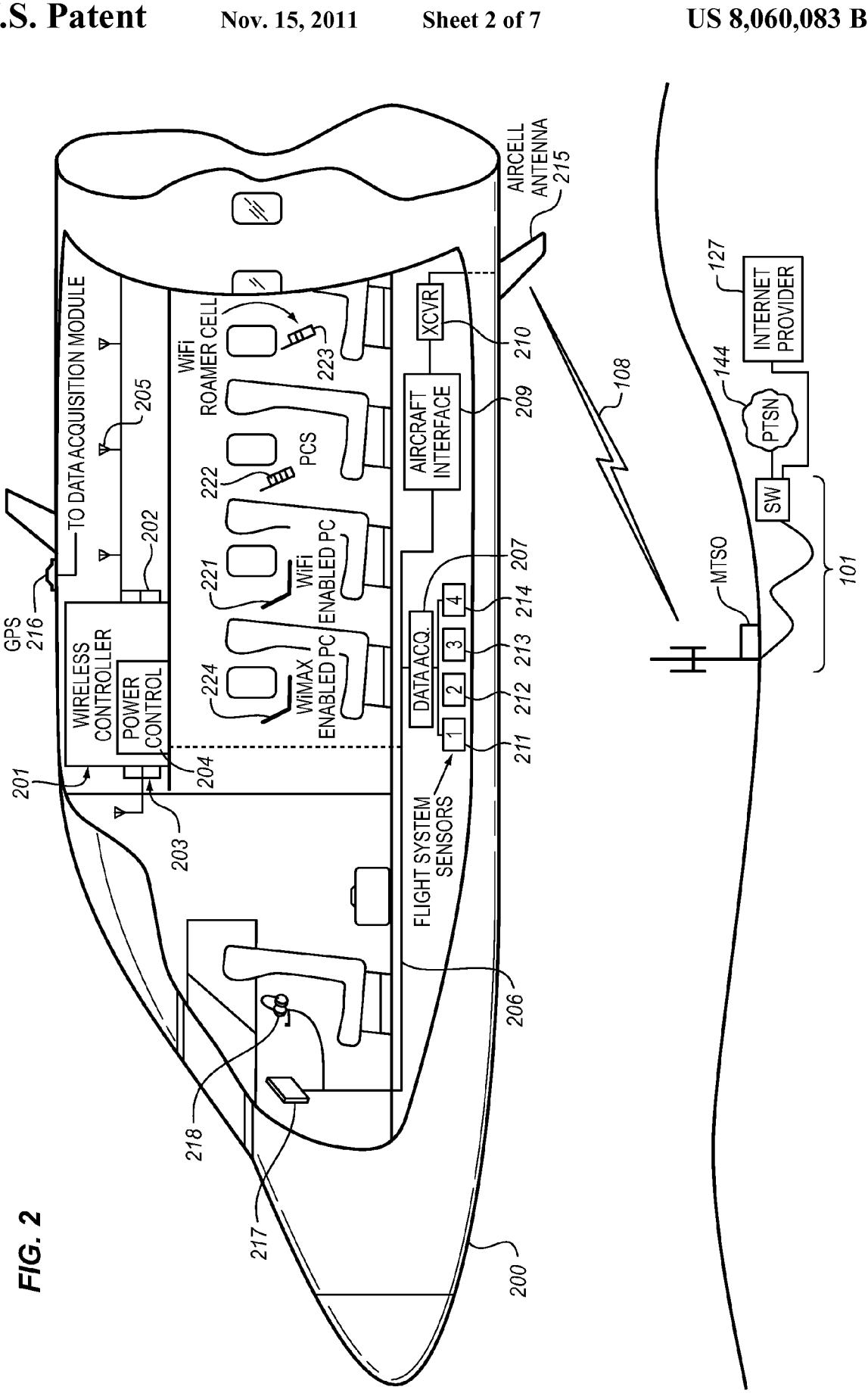
FIG. 2 illustrates, in block diagram form, the architecture of a typical embodiment of a typical aircraft-based network for wireless devices as embodied in a multi-passenger commercial aircraft.

FIG. 2 illustrates the architecture of a typical aircraft-based network for passengers' wireless devices as embodied in a multi-passenger commercial aircraft 200. This system comprises a plurality of elements used to implement a communication backbone that is used to enable wireless communication for a plurality of wireless communication devices of diverse nature. The aircraft-based network for passengers' wireless devices comprises a Local Area Network 206 that includes a radio frequency communication system 201 that uses a spread spectrum paradigm and has a short range of operation. This network 206 supports both circuit-switched and packet-switched connections from passengers' wireless devices 221-224 and interconnects the communications of these passengers' wireless devices 221-224 via a gateway transceiver or transceivers 210 to the Public Switched Telephone Network (PSTN) 126 and other destinations, such as the Internet 127 or Public Data Switched Network (PDSN). The wireless passengers thereby retain their single number identity as if they were directly connected to the Public Switched Telephone Network 126. The passengers' wireless devices 221-224 include a diversity of communication devices, such as laptop computers 221, cellular telephones 222, MP3 music players (not shown), Personal Digital Assistants (PDA) (not shown), WiFi-based devices 223, WiMax-based devices 224, and the like, and for simplicity of description are all collectively termed "passengers' wireless devices" herein, regardless of their implementation-specific details.

The basic elements of the aircraft-based network for passengers' wireless devices comprises at least one antenna 205 or means of coupling electromagnetic energy to/from the Air Subsystem 3 located within the aircraft 200 which serves to communicate with the plurality of passengers' wireless devices 221-224 located within the aircraft 200. The at least one antenna 205 is connected to a wireless controller 201 that encompasses a plurality of elements that serve to regulate the wireless communications with the plurality of passengers' wireless devices 221-224. The wireless controller 201 includes at least one low power radio frequency transceiver 202 for providing a circuit-switched communication space using a wireless communication paradigm, such as PCS, CDMA, or GSM, for example. In addition, the wireless controller 201 includes a low power radio frequency transceiver 203 for providing a data-based packet-switched communication space using a wireless communication paradigm, such as WiFi (which could also convey packet-switched Voice over Internet Protocol (VoIP)).

Finally, the wireless controller 201 includes a power control segment 204 that serves to regulate the power output of the plurality of passengers' wireless devices. It also serves, by RF noise or jamming apparatus, to prevent In-Cabin passengers' wireless devices from directly and errantly accessing the ground network when in a non-terrestrial mode. The ultra-low airborne transmit power levels feature represents a control by the Power Control element 204 of the wireless controller 201 of the aircraft-based network for passengers' wireless devices to regulate the output signal power produced by the passengers' wireless devices 221-224 to minimize the likelihood of receipt of a cellular signal by ground-based cell sites or ground-based passengers' wireless devices.

It is obvious that these above-noted segments of the wireless controller 201 can be combined or parsed in various ways to produce an implementation that differs from that disclosed herein. The particular implementation described is selected for the purpose of illustrating the concept of the invention and is not intended to limit the applicability of this concept to other implementations.

The wireless controller 201 is connected via a backbone network 206 to a plurality of other elements which serve to provide services to the passengers' wireless devices 221-224. These other elements can include an Aircraft Interface 209 for providing management, switching, routing, and aggregation functions for the communication transmissions of the passengers' wireless devices. A data acquisition element 207 serves to interface with a plurality of flight system sensors 211-214 and a Global Positioning System element 216 to collect data from a plurality of sources as described below. Furthermore, pilot communication devices, such as the display 217 and headset 218, are connected to this backbone network 206 either via a wired connection or a wireless connection.

Finally, a gateway transceiver(s) 210 is used to interconnect the Aircraft Interface 209 to an antenna 215 to enable signals to be transmitted from the aircraft-based network for passengers' wireless devices to transceivers located on the ground. Included in these components is a communications router function to forward the communication signals to the proper destinations. Thus, signals that are destined for passengers on the aircraft are routed to these individuals, while signals routed to passengers located, for example, on the ground are routed to the Ground Subsystem. Aircraft antenna patterns that typically minimize nadir (Earth-directed) effective radiated power (ERP) may be used in the implementation of the antenna(s) 215 on the aircraft to serve the aircraft-based network for passengers' wireless devices.

Passenger Login for System Access

On each aircraft, the passenger access to electronic communications typically is regulated via a passenger's wireless device registration process, where each electronic device must be identified, authenticated, and authorized to receive service. Since the aircraft is a self-contained environment with respect to the wireless communications between the passengers' wireless devices and the airborne wireless network extant in the aircraft, all communications are regulated by the network controller. Thus, when a passenger activates their passenger's wireless device, a communication session is initiated between the passenger's wireless device and the network controller to identify the type of device the passenger is using and, thus, its wireless protocol. A "splash screen" is delivered to the passenger on their wireless device to announce entry into the wireless network portal. Once this is established, the network controller transmits a set of login displays to the passenger's wireless device to enable the passenger to identify themselves and validate their identity (if the passenger's wireless device is not equipped to automatically perform these tasks via a smart client which automatically logs the passenger into the network). As a result of this process, the passenger's wireless device is provided with a unique electronic identification (IP address), and the network can respond to the passenger's wireless device without further administrative overhead. The authentication process may include the use of security processes, such as a password, scan of a passenger immutable characteristic (fingerprint, retina scan, etc.), and the like.

Once the passenger's wireless device is logged in, the passenger can access the free standard electronic services that are available from the network or customized electronic services for the particular passenger. The screens that are presented to the passengers can be customized to present the branding of the airline on which the passenger is traveling.

Mobile Wireless Network Architecture

Figure 3:
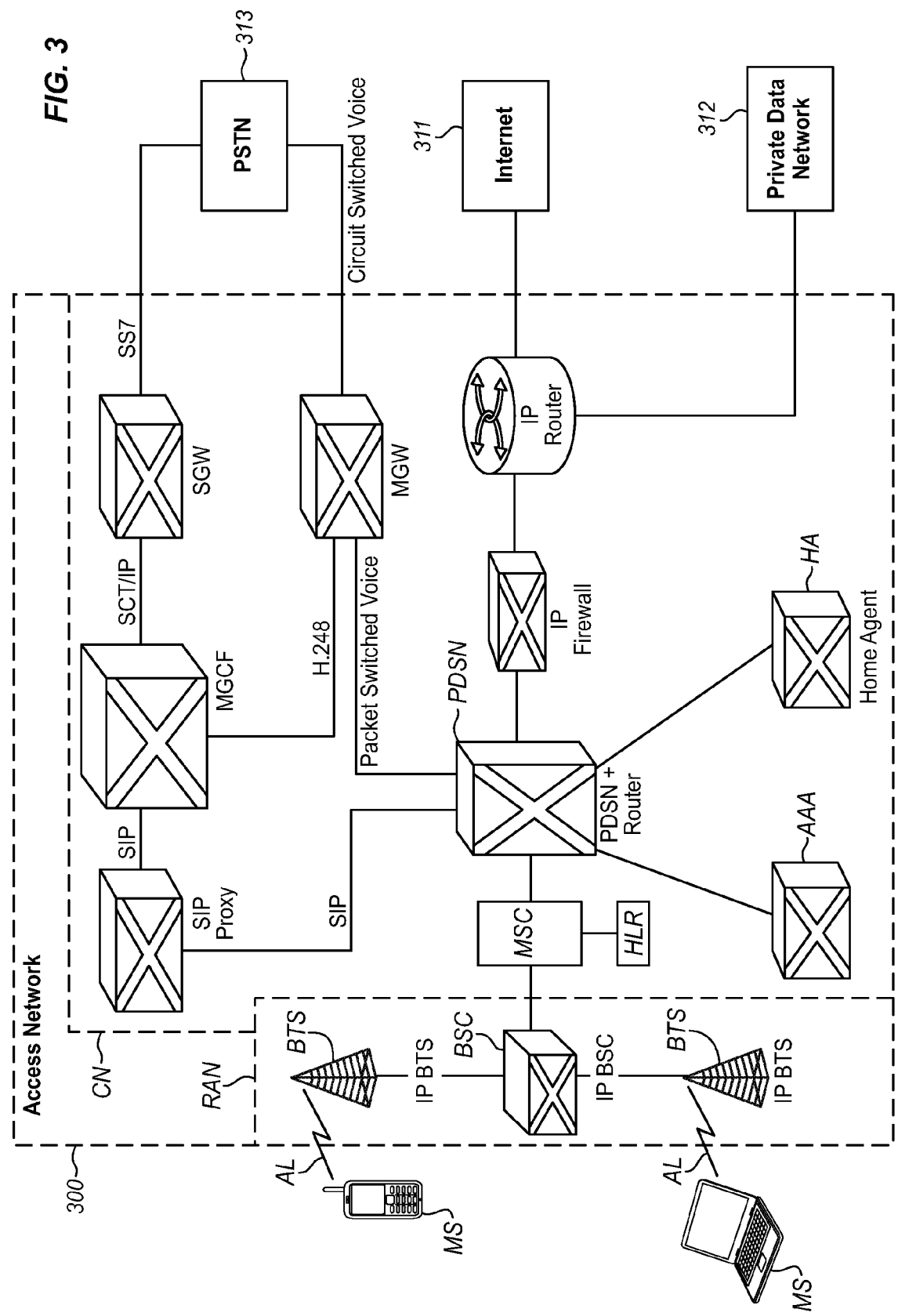
FIG. 3 illustrates, in block diagram form, the architecture of a typical cellular network for IP data and voice services.

For simplicity of description, the following example is based upon the use of a CDMA2000 EVDO cellular network paradigm. However, the concepts illustrated herein are not limited to this implementation, and it is expected that other implementations can be created based upon other network architectures and implementations. Therefore, FIG. 3 illustrates, in block diagram form, the architecture of a typical EVDO cellular network for IP data and voice services, respectively, and which are used to illustrate the architecture and operation of the present Aircraft Emergency Services Call Management System. CDMA2000 is a hybrid 2.5G/3G technology of mobile telecommunications that uses CDMA (code division multiple access) to send digital radio, voice, data, and signaling data between wireless devices and cell sites. The architecture and operation of the CDMA2000 cellular network is standardized by the 3rd Generation Partnership Project 2 (3GPP2). In a CDMA2000 cellular network, two radio Access Network technologies are supported: 1×RTT and EV-DO (Evolution-Data Optimized), wherein CDMA2000 is considered a third generation (3G) technology when the EV-DO Access Network is used.

The CDMA 2000 cellular network (also termed "Access Network" herein) comprises three major parts: the core network (CN), the radio Access Network (RAN), and the wireless device (MS). The core network (CN) is further decomposed in two parts, one interfacing to external networks such as the Public Switched Telephone Network (PSTN) and the other interfacing to an IP-based network such as the Internet 311 and/or private data networks 312. The wireless device MS terminates the radio path on the user side of the cellular network and enables subscribers to access network services over the interface Um implemented to interconnect the wireless device (MS) with the Access Network 300.

Several key components of the Access Network 300 for IP data and voice as illustrated in FIG. 3 are:
- Base Transceiver System (BTS): an entity that provides transmission capabilities across the Um reference point. The Base Transceiver System (BTS) consists of radio devices, antenna, and equipment.
- Base Station Controller (BSC): an entity that provides control and management for one or more Base Transceiver Systems (BTS).
- Packet Control Function (PCF): an entity that provides the interface function to the packet-switched network Internet 311 and/or Private Data Network 312).

The wireless device (MS) functions as a mobile IP client. The wireless device (MS) interacts with the Access Network 300 to obtain appropriate radio resources for the exchange of packets and keeps track of the status of radio resources (e.g., active, stand-by, dormant). The wireless device (MS) accepts buffer packets from the Base Transceiver System (BTS) when radio resources are not in place or are insufficient to support the flow to the Access Network 300. Upon power-up, the wireless device (MS) automatically registers with the Home Location Register (HLR) in the Mobile Switching Center (MSC) in order to:
- Authenticate the wireless device (MS) for the environment of the accessed network;
- Provide the Home Location Register (HLR) with the wireless device's present location; and
- Provide the Serving Mobile Switching Center (MSC) with the wireless device's permitted feature set.

After successfully registering with the Home Location Register (HLR), the wireless device (MS) is ready to place voice and data calls. These may take either of two forms, Circuit-Switched Data (CSD) or Packet-Switched Data (PSD), depending on the wireless device's own compliance (or lack thereof with the IS-2000 standard.

Wireless devices must comply with IS-2000 standards to initiate a packet data session using the Access Network 300. Wireless devices which have only IS-95 capabilities are limited to Circuit-Switched Data transmitted via the Public Switched Telephone Network (PSTN), while IS-2000 terminals can select either the Packet-Switched Data or Circuit-Switched Data. Parameters forwarded by the wireless device (MS) over the air link (AL) to the Access Network 300 determine the type of service requested. For each data session, a Point-to-Point Protocol (PPP) session is created between the wireless device (MS) and the Packet Data Serving Node (PDSN). IP address assignment for each wireless device can be provided by either the Packet Data Serving Node (PDSN) or a Dynamic Host Configuration Protocol (DHCP) server via a Home Agent (HA).

The Radio Access Network (RAN)

The Radio Access Network (RAN) is the wireless device's entry point for communicating either data or voice content. It consists of:
- The air link (AL);
- The cell site tower/antenna and the cable connection to the Base Transceiver Subsystem (BTS);
- The Base Transceiver Subsystem (BTS);
- The communications path from the Base Transceiver Subsystem to the Base Station Controller (BSC);
- The Base Station Controller (BSC); and
- The Packet Control Function (PCF).

The Radio Access Network (RAN) has a number of responsibilities that impact the network's delivery of packet services in particular. The Radio Access Network (RAN) must map the mobile client identifier reference to a unique link layer identifier used to communicate with the Packet Data Serving Node (PDSN), validate the wireless device for access service, and maintain the established transmission links.

The Base Transceiver Subsystem (BTS) controls the activities of the air link (AL) and acts as the interface between the Access Network 300 and the wireless device (MS). Radio Frequency resources such as frequency assignments, sector separation, and transmit power control are managed at the Base Transceiver Subsystem (BTS). In addition, the Base Transceiver Subsystem (BTS) manages the back-haul from the cell site to the Base Station Controller (BSC) to minimize any delays between these two elements.

The Base Station Controller (BSC) routes voice- and circuit-switched data messages between the cell sites and the Mobile Switching Center (MSC). It also bears responsibility for mobility management: it controls and directs handoffs from one cell site to another as needed.

The Packet Control Function (PCF) routes IP packet data between the mobile station (MS) within the cell sites and the Packet Data Serving Node (PDSN). During packet data sessions, it assigns available supplemental channels as needed to comply with the services requested by the wireless device (MS) and paid for by the subscribers.

Packet Data Serving Node (PDSN)

The Packet Data Serving Node (PDSN) is the gateway from the Radio Access Network (RAN) into the public and/or private packet networks. In a simple IP network, the Packet Data Serving Node (PDSN) acts as a standalone Network Access Server (NAS), while in a mobile IP network it can be configured as a Home Agent (HA) or a Foreign Agent (FA). The Packet Data Serving Node (PDSN) implements the following activities:

- Manage the radio-packet interface between the Base Station Subsystem (BTS), the Base Station Controller (BSC), and the IP network by establishing, maintaining, and terminating link layer to the mobile client;
- Terminate the Point-to-Point Protocol (PPP) session initiated by the subscriber;
- Provide an IP address for the subscriber (either from an internal pool or through a Dynamic Host Configuration Protocol (DHCP) server or through an Authentication, Authorization, and Accounting (AAA) server);
- Perform packet routing to external packet data networks or packet routing to the Home Agent (HA) which optionally can be via secure tunnels;
- Collect and forward packet billing data;
- Actively manage subscriber services based on the profile information received from the SCS server of the Authentication, Authorization, and Accounting (AAA) server; and
- Authenticate users locally, or forward authentication requests to the Authentication, Authorization, and Accounting (AAA) server.

Authentication, Authorization, and Accounting Server

The Authentication, Authorization, and Accounting (AAA) server is used to authenticate and authorize subscribers for network access and to store subscriber usage statistics for billing and invoicing.

The Home Agent

The Home Agent (HA) supports seamless data roaming into other networks that support 1×RTT. The Home Agent (HA) provides an anchor IP address for the mobile device and forwards any mobile-bound traffic to the appropriate network for delivery to the handset. It also maintains user registration, redirects packets to the Packet Data Serving Node (PDSN), and (optionally) tunnels securely to the Packet Data Serving Node (PDSN). Lastly, the Home Agent (HA) supports dynamic assignment of users from the Authentication, Authorization, and Accounting (AAA) server and (again optionally) assigns dynamic home addresses.

Traditional Single Call Setup in a CDMA2000 Access Network

A successful call set-up scenario for a single wireless device to establish a communication connection in a CDMA2000 Access Network is described below. Note that this explanation bypasses the radio reception/transmission activities of the Base Transceiver Subsystem (BTS), concentrating instead on the protocol functions that begin with the Origination dialogue between the wireless device (MS) and the Base Station Controller (BSC):

1. To register for packet data services, the wireless device (MS) sends an Origination Message over the Access Channel to the Base Station Subsystem (BSS).
2. The Base Station Subsystem (BSS) acknowledges the receipt of the Origination Message, returning a Base Station Ack Order to the wireless device (MS).
3. The Base Station Subsystem (BSS) constructs a CM Service Request message and sends the message to the Mobile Switching Center (MSC).
4. The Mobile Switching Center sends an Assignment Request message to the Base Station Subsystem (BSS) requesting assignment of radio resources. No terrestrial circuit between the Mobile Switching Center (MSC) and the Base Station Subsystem (BSS) is assigned to the packet data call.
5. The Base Station Subsystem (BSS) and the wireless device (MS) perform radio resource set-up procedures. The Packet Control Function (PCF) recognizes that no A10 connection associated with this wireless device (MS) is available and selects a Packet Data Serving Node (PDSN) for this data call. The A10 connection is a term defined by the standards bodies and refers to an Interface between Base Station Controller (BSC) and the Packet Data Serving Node (PDSN), where A10 references IP user data exchanged between the Base Station Controller (BSC) and the Packet Data Serving Node (PDSN).
6. The Packet Control Function (PCF) sends an A11-Registration Request message to the selected Packet Data Serving Node (PDSN).
7. The A11-Registration Request is validated and the Packet Data Serving Node (PDSN) accepts the connection by returning an A11-Registration Reply message. Both the Packet Data Serving Node (PDSN) and the Packet Control Function (PCF) create a binding record for the A10 connection. The term "A11" references signaling exchanged between the Base Station Controller (BSC) and the Packet Data Serving Node (PDSN).
8. After both the radio link and the A10 connection are set up, the Base Station Subsystem (BSS) sends an Assignment Complete message to the Mobile Switching Center (MSC).
9. The mobile device and the Packet Data Serving Node (PDSN) establish the link layer (PPP) connection and then perform the MIP registration procedures over the link layer (PPP) connection.
10. After completion of MIP registration, the mobile device can send/receive data via GRE framing over the A10 connection.
11. The Packet Control Function (PCF) periodically sends an A11-Registration Request message for refreshing registration for the A10 connection.
12. For a validated A11-Registration Request, the Packet Data Serving Node (PDSN) returns an A11-Registration Reply message. Both the Packet Data Serving Node (PDSN) and the Packet Control Function (PCF) update the A10 connection binding record.

For a circuit-switched voice call, the additional elements shown in FIG. 3B are required. In particular, the packet-switched voice call received from the wireless device (MS) is forwarded from the Packet Data Serving Node (PDSN) to the Media Gateway (MGW) where it is converted to circuit-switched voice and delivered to the Public Switched Telephone Network (PTSN). In addition, call setup data is exchanged with the Session Initiated protocol Proxy Server (SIP) to provide a signaling and call setup protocol for IP-based communications that can support a superset of the call processing functions and features present in the Public Switched Telephone Network (PSTN). The Media Gateway Control Function (MGCF) and the Signaling Gateway (SGW) implement the call processing features present in Signaling System 7 (SS7).

As can be seen from the above description, this Access Network 300 is wireless device-centric, in that it is predicated on each wireless device establishing an individual Air Link (AL) radio frequency connection with the local Base Transceiver Subsystem (BTS). There is nothing in this architecture that specifically addresses the instance where a plurality of wireless devices are served by a broadband communication link from some location (aircraft, ship, train, etc.), with the broadband link being terminated at the edge of the Access Network 300. The difficulty with the use of the broadband link is that the Packet Data Serving Node (PDSN) assigns a single IP address to the broadband link as part of the Point-to-Point Protocol (PPP), and the wireless devices that exist at the distal end of the broadband link are not identified to the Packet Data Serving Node (PDSN) and do not, therefore, receive individual services.

Emergency Services Call from Wireless Devices Onboard an Aircraft

Figure 4:
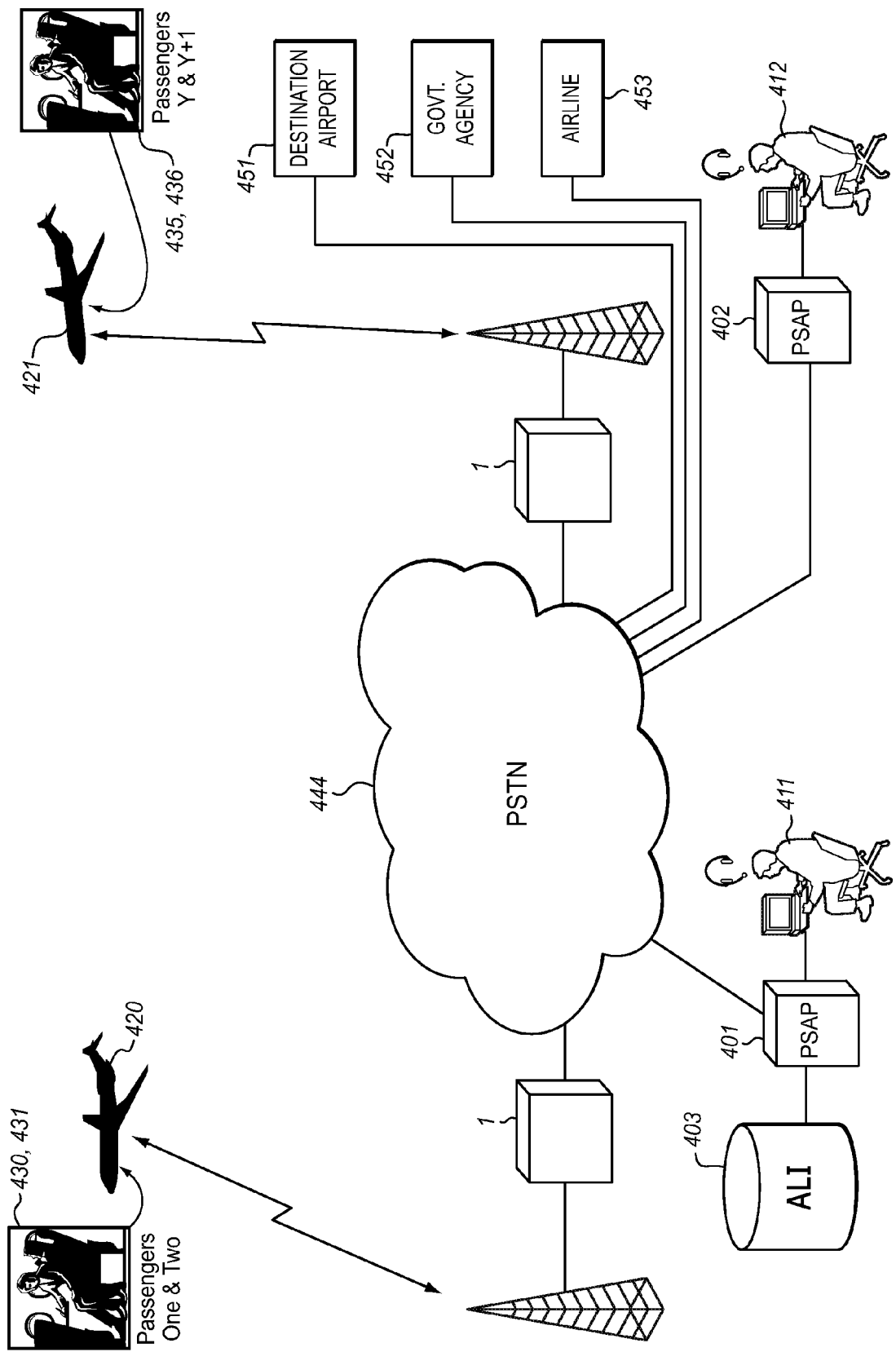
FIG. 4 illustrates, in block diagram form, an implementation of the present Aircraft Emergency Services Call Management System.
Figure 5:
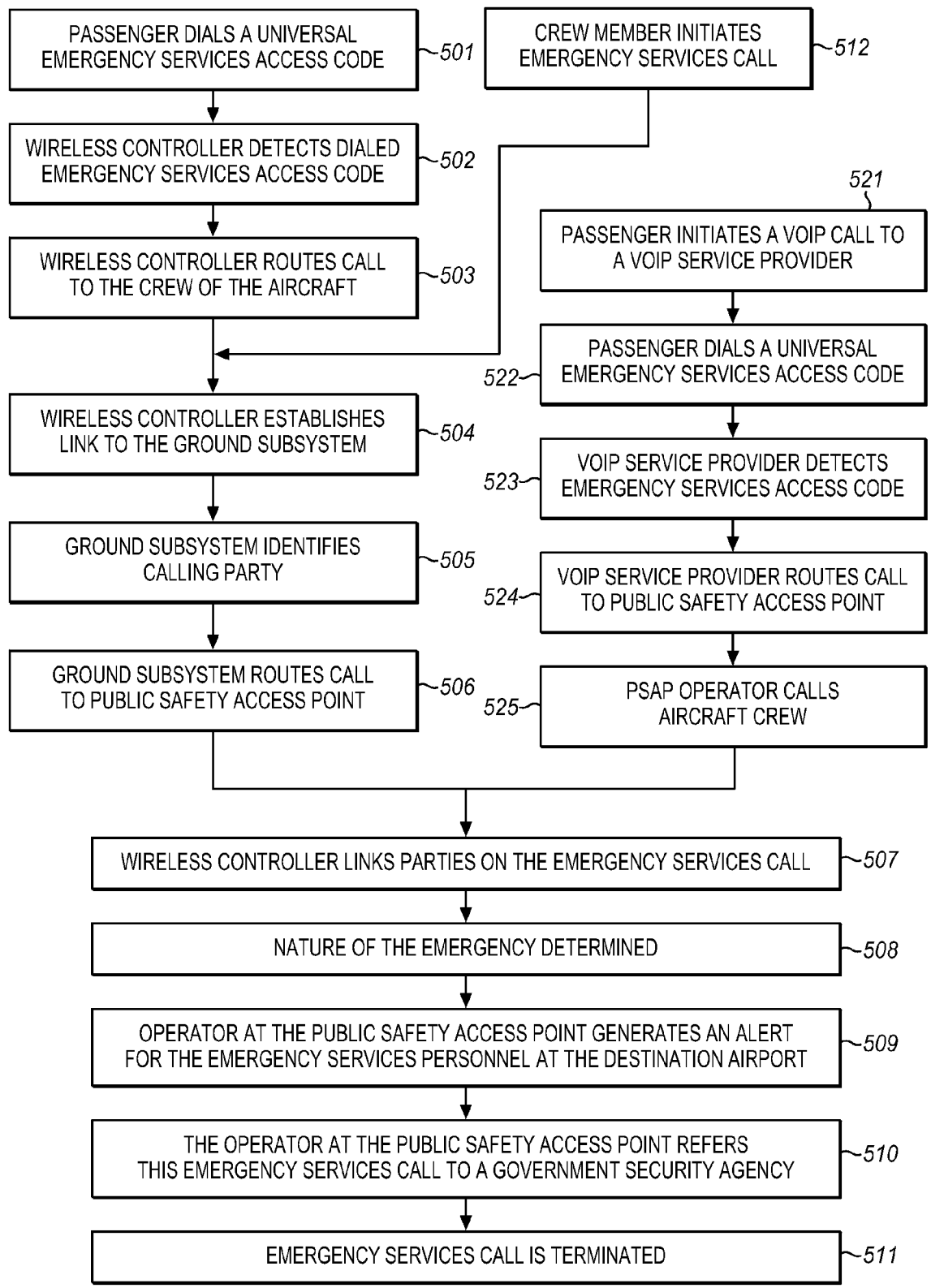
FIG. 5 illustrates, in flow diagram form, the operation of the present Aircraft Emergency Services Call Management System.

FIG. 4 illustrates, in block diagram form, the architecture of the Aircraft Emergency Services Call Management System, while FIG. 5 illustrates, in flow diagram form, the typical operation of the Aircraft Emergency Services Call Management System. This represents one possible implementation of the system, although numerous alternatives are possible within the scope of the concept articulated herein. The Aircraft Emergency Services Call Management System can be viewed as three primary components: Aircraft-Based Emergency Call Processing (part of wireless controller 201), Ground-Based Emergency Call Processing (part of Ground Subsystem 1), and Public Safety Answering Point (PSAP) 401.

Given the Aircraft Network described above, the Emergency Services call can be originated via a voice-based wireless device, a VoIP Call, or even a Data Message from a wireless device. The processing of an Emergency Services call in each of these instances requires different initial communications management, but the functional operation among these calls is consistent. Thus, the description that follows provides a basic functional service but varies on the communication link to the passenger who originates the Emergency Services call.

For the purpose of illustration, assume Passenger One (430) in aircraft 420 uses their wireless device to originate an Emergency Services call to the Aircraft Emergency Services Call Management System, which comprises software and hardware located in the various systems described below to interconnect the various parties to the Aircraft Emergency Services Call. If the wireless device is a voice-based wireless device, the passenger at step 501 can dial a universal Emergency Services access code, such as 911 in North America and 112 in Europe, to access emergency dispatch personnel 411-412 who are located at a predefined Public Safety Access Point (PSAP) 401-402 that serves aircraft. There can be a single nationwide Public Safety Access Point (PSAP) 401 that serves aircraft, or there may be multiple sites 401-402; but for the purpose of this description, a single Public Safety Access Point (PSAP) 401 that serves aircraft is used as the example. The dialed digits of the Emergency Services call can be detected by an Aircraft Emergency Services Call software component step 502 in the wireless controller 201 in the Aircraft Network (Air Subsystem 3) and initially routed to the crew of the aircraft at step 503, with the initial contact preferably being made to a member of the cabin crew. Substantially simultaneously, at step 504, a communications link is established as described above via the Air-to-Ground Network 2 to the Ground Subsystem 1, which identifies the calling party (passenger 430) at step 505. The identity of the passenger 430 is known, since they are logged in on the Aircraft Network, and the passenger identity information can be stored in the Automatic Location Identification (ALI) database 403 which stores data which identifies each aircraft, the presently-serving Ground Subsystem 1 and its Air-to-Ground link 2, as well as the identity of all of the passengers who are logged in to the Aircraft Network. At step 506, the Emergency Services call is routed by an Aircraft Emergency Services Call software component located in Ground Subsystem 1 via the Public Switched Telephone Network 444 to the Public Safety Access Point (PSAP) 401 that serves aircraft. These communication connections can be linked at step 507 as a multi-party conference so the member of the cabin crew (optionally including a member of the flight deck crew) as well as the operator 411 at the Public Safety Access Point (PSAP) 401 can both communicate with the passenger 430 who originated the Emergency Services call.

The member of the cabin crew and the operator 411 at the Public Safety Access Point (PSAP) 401 determine the nature of the emergency at step 508 and identify what steps are necessary to deal with the emergency. If necessary, the operator 411 at the Public Safety Access Point (PSAP) 401 generates an alert at step 509 which is transmitted to the Emergency Services personnel (not shown) at the destination airport (451) and/or the airline 453 who is operating this aircraft. Alternatively, the operator 411 at the Public Safety Access Point (PSAP) 401 may refer this Emergency Services call at step 510 to a government security agency (452) and/or the airline (453) for a determination of a course of action, which may include diverting the aircraft 420 to an alternate destination airport. Again, the communications may be implemented via a multi-party conference connection as is known in the art. The Emergency Services call remains active until the emergency is resolved wherein the Emergency Services call is terminated at step 511.

If the Emergency Services call is originated by a member of the cabin crew at step 512, then call processing advances to step 504 as described above and the processing continues without the presence of the passenger on the communications connections.

Alternatively, the passenger at step 521 can initiate a VoIP call and dial a universal Emergency Services access code, such as 911 in North America and 112 in Europe, to access emergency dispatch personnel who are located at a predefined Public Safety Access Point (PSAP) 401 that serves aircraft. Since the initial VoIP call is directed to a VoIP service provider or a private network, the dialed Emergency Services access code is not detected or processed by the wireless controller 201 onboard the aircraft 420 since the dialed digits are input at step 522 subsequent to the initial call setup. Thus, at step 523, the VoIP service provider must detect the dialed Emergency Services access code and route the Emergency Services call to the predefined Public Safety Access Point (PSAP) 401 that serves aircraft 420 at step 524. In order to properly route the Emergency Services call to the proper predefined Public Safety Access Point (PSAP) 401 that serves aircraft 420, the incoming communications connection from the Ground Subsystem 1 must include call setup data that indicates the origination point of this call as being aircraft-based and also identify the aircraft 420 from which the Emergency Services call originated. Again, as described above, the passenger wireless device is positively identified, since it has logged into the aircraft-based network for passengers' wireless devices portion of the Air Subsystem 3 using the passenger's wireless device registration process described above.

The operator 411 establishes a communication connection to the crew of the aircraft 411 at step 525. These communication connections can be linked at step 507 as a multi-party conference so the member of the cabin crew (optionally including a member of the flight deck crew) as well as the operator 411 at the Public Safety Access Point (PSAP) 401 can both communicate with the passenger who originated the Emergency Services call. Processing of the Emergency Services call would then proceed as described above.

A further method of originating an Emergency Services call is via a Data Message, generated at 531, via the WEB interface provided by the wireless controller 201 to the passenger's wireless device (such as a laptop). Again, as described above, the passenger's wireless device is positively identified, since it has logged into the aircraft-based network for passengers' wireless devices portion of the Air Subsystem 3 using the passenger's wireless device registration process described above.

In all of the above-noted examples, the processing of the Emergency Services call enables the parties involved to exchange information and respond to the emergency situation, regardless of the mode in which the Emergency Services call was initiated. There can be other communication scenarios that would be analogous to those described above in terms of functionality, but these are intended to be encompassed in the process that has been outlined above.

Summary

The Aircraft Emergency Services Call Management System enables the assignment of individual Internet Protocol (IP) addresses to each of the passengers' wireless devices, operating in an aircraft and served by an airborne wireless cellular network, thereby to enable delivery of wireless services to the individually identified wireless devices.

What is claimed as new and desired to be protected by Letters Patent of the United States is:

1. A system for providing emergency services communications onboard an aircraft, comprising:
   an aircraft network, located in said aircraft, for wirelessly exchanging digital communication signals with communication devices of at least one of: the aircraft crew and the occupants of said aircraft;
   a ground-based Access Network for concurrently exchanging digital communication signals with the airline which operates the aircraft, and at least one of: a Public Safety Access Points and a government agency;
   air-to-ground network for carrying said communication signals between said aircraft network and said ground-based Access Network to establish communications between said communication devices and said ground-based communications network by exchanging both subscriber traffic and at least one of network signaling and administrative data on separate concurrently available logical channels between said aircraft network and said ground-based communications network; and
   an emergency services communication system, responsive to origination of an emergency services call comprising the transmission of an Emergency Services access code from said communication device of at least one of the aircraft crew and an occupant of said aircraft, for concurrently interconnecting said communication device of at least one of the aircraft crew and the occupant of said aircraft with: at least two of an aircraft crew member located in said aircraft via said aircraft network, and said Public Safety Access Point, the airline which operates the aircraft, and a government agency via said aircraft network, said air-to-ground network and said ground-based Access Network;
   wherein said emergency services communication system further comprises:
      an alert generator, responsive to an operator at said Public Safety Access Point generating an emergency event alert, for forwarding said generated emergency event alert to emergency services personnel at a destination to which said aircraft is routed.

2. The system for providing emergency services communications onboard an aircraft of claim 1 wherein said emergency services communication system comprises:
   a calling party identification, responsive to an occupant of said aircraft initiating said emergency services call, for identifying said occupant of said aircraft and said aircraft.

3. The system for providing emergency services communications onboard an aircraft of claim 1 wherein said emergency services communication system further comprises:
   a referral module for interconnecting an operator at said Public Safety Access Point with a government security agency.

4. The system for providing emergency services communications onboard an aircraft of claim 1 wherein said emergency services communication system comprises:
   a calling party identification, responsive to a crew member initiating said emergency services call, for identifying said crew member and said aircraft; and
   wherein said emergency services communication system automatically interconnects said communication device of said crew member of said aircraft with said Public Safety Access Point via said aircraft network, said air-to-ground network, and said ground-based Access Network.

5. The system for providing emergency services communications onboard an aircraft of claim 4 wherein said emergency services communication system further comprises:
   an alert generator, responsive to an operator at said Public Safety Access Point generating an emergency event alert, for forwarding said generated emergency event alert to emergency services personnel at a destination to which said aircraft is routed.

6. The system for providing emergency services communications onboard an aircraft of claim 4 wherein said emergency services communication system further comprises:
   a referral module for interconnecting an operator at said Public Safety Access Point with a government security agency.

7. A method of providing emergency services communications onboard an aircraft, comprising:
   wirelessly exchanging, via an aircraft network located in said aircraft, digital communication signals with communication devices of at least one of: the aircraft crew and the occupant of said aircraft;
   concurrently exchanging, via a ground-based Access Network, digital communication signals with the airline which operates the aircraft, and at least one of: a Public Safety Access Point, and a government agency;
   carrying, via an air-to-ground network, said communication signals between said aircraft network and said ground-based Access Network to establish communications between said communication devices and said ground-based communications network by exchange both subscriber traffic and at least one of network signaling and administrative data on separate concurrently available logical channels between said aircraft network and said ground-based communications network; and
   concurrently interconnecting, in response to origination of an emergency services call comprising the transmission of an Emergency Services access code from said communication device of an occupant of said aircraft, said communication device of at least one of the aircraft crew and an occupant of said aircraft with at least two of an aircraft crew member located in said aircraft via said aircraft network, said Public Safety Access Point, the airline which operates the aircraft, and a government agency via said aircraft network, said air-to-ground network, and said ground-based Access Network;

wherein said step of concurrently interconnecting further comprises:
forwarding, in response to an operator at said Public Safety Access Point generating an emergency event alert, said generated emergency event alert to emergency services personnel at a destination to which said aircraft is routed.

8. The method of providing emergency services communications onboard an aircraft of claim 7 wherein said step of concurrently interconnecting comprises:
identifying, in response to an occupant of said aircraft initiating said emergency services call, said occupant.

9. The system for providing emergency services communications onboard an aircraft of claim 7 wherein said step of concurrently interconnecting further comprises:
interconnecting an operator at said Public Safety Access Point with a government security agency.

10. The system for providing emergency services communications onboard an aircraft of claim 7 wherein said step of concurrently interconnecting comprises:
identifying, in response to a crew member initiating said emergency services call, said crew member; and
wherein said step of concurrently interconnecting interconnects said communication device of said crew member of said aircraft with said Public Safety Access Point via said air-to-ground network and said ground-based Access Network.

11. The system for providing emergency services communications onboard an aircraft of claim 10 wherein said step of concurrently interconnecting further comprises:
forwarding, in response to an operator at said Public Safety Access Point generating an emergency event alert, said generated emergency event alert to emergency services personnel at a destination to which said aircraft is routed.

12. The system for providing emergency services communications onboard an aircraft of claim 10 wherein said step of concurrently interconnecting further comprises:
interconnecting an operator at said Public Safety Access Point with a government security agency.

13. A system for providing emergency services communications onboard an aircraft, comprising:
an aircraft network, located in said aircraft, for wirelessly exchanging digital communication signals with communication devices of at least one of: the aircraft crew and the occupants of said aircraft;
a ground-based Access Network for concurrently exchanging digital communication signals with the airline which operates the aircraft, and at least one of: a Public Safety Access Point and a government agency;
an air-to-ground network for carrying said communication signals between said aircraft network and said ground-based Access Network to establish communications between said communication devices and said ground-based communications network by exchanging both subscriber traffic and at least one of network signaling and administrative data on separate concurrently available logical channels between said aircraft network and said ground-based communications network;
an emergency services communication system, responsive to origination of an emergency services call comprising the transmission of an Emergency Services access code from said communication device of at least one of the aircraft crew and an occupant of said aircraft, for concurrently interconnecting said communication device of at least one of the aircraft crew and an occupant of said aircraft with said Public Safety Access Point, the airline which operates the aircraft, and a government agency via said aircraft network, said air-to-ground network, and said ground-based Access Network; and
an alert generator, responsive to an operator at said Public Safety Access Point generating an emergency event alert, for forwarding said generated emergency event alert to emergency services personnel at a destination to which said aircraft is routed.

14. The system for providing emergency services communications onboard an aircraft of claim 13 wherein said emergency services communication system further comprises:
a referral module for interconnecting an operator at said Public Safety Access Point with a government security agency.

15. A method of providing emergency services communications onboard an aircraft, comprising:
wirelessly exchanging, via an aircraft network located in said aircraft, digital communication signals with communication devices of at least one off the aircraft crew and the occupants of said aircraft;
concurrently exchanging, via a ground-based Access Network, digital communication signals with the airline which operates the aircraft, and at least one of: a Public Safety Access Point and a government agency;
carrying, via an air-to-ground network, said communication signals between said aircraft network and said ground-based Access Network to establish communications between said communication devices and said ground-based communications network by exchanging both subscriber traffic and at least one of network signaling and administrative data on separate concurrently available logical channels between said aircraft network and said ground-based communications network;
concurrently interconnecting, in response to origination of an emergency services call comprising the transmission of a an Emergency Services access code from said communication device of an occupant of said aircraft, said communication device of at least one of the aircraft crew and an occupant of said aircraft with said Public Safety Access Point, the airline which operates the aircraft, and a government agency via said aircraft network, said air-to-ground network, and said ground-based Access Network; and
linking said occupant with at least two of said at least one aircraft crew member located in said aircraft via said aircraft network, and at least one of: said Public Safety Access Point° the airline which operates the aircraft, and a government agency via said air-to-ground network, and said ground-based Access Network;
wherein said step of concurrently interconnecting further comprises:
forwarding, in response to an operator at said Public Safety Access Point generating an emergency event alert, said generated emergency event alert to emergency services personnel at a destination to which said aircraft is routed.

* * * * *